US009879798B2

(12) United States Patent
van Diessen et al.

(10) Patent No.: US 9,879,798 B2
(45) Date of Patent: Jan. 30, 2018

(54) VALVE POSITION INDICATOR AND A METHOD FOR INDICATING A VALVE POSITION

(71) Applicant: Netherlocks Safety Systems B.V., Alphen aan den Rijn (NL)

(72) Inventors: Stefan Leonardus Maria van Diessen, Alphen aan den Rijn (NL); Noell Fredericus Frances van der Horst, Alphen aan den Rijn (NL); Boudewijn Slager, Alphen aan den Rijn (NL); Petrus Lambertus Loggen, Alphen aan den Rijn (NL)

(73) Assignee: NETHERLOCKS SAFETY SYSTEMS B.V., Alphen Aan Den Rijn (NL)

( * ) Notice: Subject to any disclaimer, the term of this patent is extended or adjusted under 35 U.S.C. 154(b) by 177 days.

(21) Appl. No.: 15/010,374

(22) Filed: Jan. 29, 2016

(65) Prior Publication Data
US 2016/0258550 A1    Sep. 8, 2016

(30) Foreign Application Priority Data
Mar. 6, 2015    (EP) .................................... 15158010

(51) Int. Cl.
*F16K 37/00*    (2006.01)
(52) U.S. Cl.
CPC ...... *F16K 37/0083* (2013.01); *F16K 37/0008* (2013.01); *F16K 37/00* (2013.01)

(58) Field of Classification Search
CPC ... F16K 37/00; F16K 37/0083; F16K 37/0008
USPC ............... 116/207, 224, 270–272, 274, 277, 116/281–285, 298, 305; 137/551, 552
See application file for complete search history.

(56) References Cited

U.S. PATENT DOCUMENTS

| 3,505,972 | A |   | 4/1970  | Benjamin |
| 3,910,308 | A | * | 10/1975 | MacK ..................... F16K 31/60 116/277 |
| 4,494,565 | A | * | 1/1985  | Sinclair .................. F16K 37/00 116/271 |
| 4,606,374 | A | * | 8/1986  | Kolenc ................... F16K 37/00 116/208 |
| 4,893,582 | A |   | 1/1990  | Kalamon et al. |
| 5,223,822 | A | * | 6/1993  | Stommes ............. F16K 37/0008 116/277 |

(Continued)

FOREIGN PATENT DOCUMENTS

EP    0702178    3/1996
GB    1271113    4/1972

*Primary Examiner* — R. A. Smith
*Assistant Examiner* — Tania Courson
(74) *Attorney, Agent, or Firm* — Peacock Myers, P.C.; Jeffrey Myers

(57) ABSTRACT

A valve position indicator/method comprising a main rotation axle operably connected with a valve. Repositioning the valve provides rotation of the main axle with a main axle disc with at least one tooth for cooperation with a gear wheel. The main axle disc has a toothless portion substantially not interfering with the gear wheel. The at least one tooth provides a rotation of the gear wheel and the toothless portion provides no rotation of the gear wheel upon rotation of the main axle disc. The gear wheel is on a secondary axle with an indication means.

18 Claims, 4 Drawing Sheets

(56) References Cited

U.S. PATENT DOCUMENTS

| | | | | |
|---|---|---|---|---|
| 5,469,805 A | * | 11/1995 | Gibbs | F16K 37/0008 |
| | | | | 116/277 |
| 5,605,176 A | * | 2/1997 | Herzberger | F16K 37/0008 |
| | | | | 116/215 |
| 6,135,147 A | * | 10/2000 | Peters | F16K 37/0008 |
| | | | | 137/552 |
| 6,213,148 B1 | | 4/2001 | Wadsworth et al. | |

* cited by examiner

VALVE POSITION INDICATOR AND A METHOD FOR INDICATING A VALVE POSITION

CROSS-REFERENCE TO RELATED APPLICATIONS

This application claims priority to and the benefit of the filing of European Patent Application No. 15 158 010.7, filed on Mar. 6, 2015, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to a valve position indicator and a method for indicating a valve position.

Description of Related Art

Valve position indicators are known in the art. Such indicators are based on a linear movement of an indicator, wherein a movement of the valve stem or spindle is linearly translated into a movement of the valve position indicator (a so-called "rising stem indicator"). As a consequence, a predetermined position of the indicator is obtained by means of a linear movement, resulting in an inaccurate reading of the indicator.

Furthermore, ODO-meter type rotation counters are known that indicate the number of rotations of a valve stem or spindle. Setting such indicator to exactly identify a fully opened or closed position is a complicated operation.

The disadvantage of linearly moving indicators, that lead to a very uncertain positioning of the indicator and as a consequence is not fit for use in an automated system, has been obviated by valve position indicators that apply an axle that is operably connected with said valve and wherein a repositioning of said valve induces a rotation of said main axle, said main axle being partly provided with a toothless portion, such that rotation of said main axle only intermittently induces a rotation of an indicator. A linear rotation of said valve therefore more or less yields an on/off behavior of said indicator. Examples of these indicators are mentioned in EP 0702178, U.S. Pat. No. 3,505,972 and U.S. Pat. No. 4,893,582.

However, these valve position indicators still suffer from disadvantages.

Therefore, an improved valve position indicator is highly desirable.

BRIEF SUMMARY OF THE INVENTION

The present invention relates to a valve position indicator according to the preamble of claim 1, said valve position indicator comprising a main rotation axle operably connected with said valve, wherein a repositioning of said valve provides a rotation of said main axle, said main axle being provided with a main axle disc comprising at least one tooth for cooperation with a gear wheel comprising a plurality of teeth evenly distributed along its circumference, said main axle disc further comprising along part of its circumference a toothless portion substantially not interfering with said gear wheel, such that said at least one tooth provides a rotation of said gear wheel and said toothless portion provides no rotation of said gear wheel upon rotation of said main axle disc; said gear wheel being provided on a secondary axle and wherein an indication means is operably connected with said second axle for providing an indication of a position of said valve. The invention further relates to a method for indicating a valve position according to claim 8.

It is especially desired to provide a valve position indicator that can be set easily and accurately after installing same on a valve.

Consequently, the invention aims at providing an improved valve position indicator of the kind mentioned in the preamble.

The invention aims at providing a valve position indicator that preferably can be easily set after having installed same on a valve stem or spindle.

The invention further aims at providing a valve position indicator that preferably yields a discrete signal when the valve reaches a predetermined position.

The invention also aims at providing a valve position indicator the range of which can be easily adapted to a specific valve type.

The invention also aims at providing a valve position indicator the accuracy of which can be increased as required by a specific valve type.

The invention further aims at providing a technically simple valve position indicator.

Furthermore, the invention aims at providing a valve position indicator that can be used with many kinds of sensors and switches presently available in the art.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
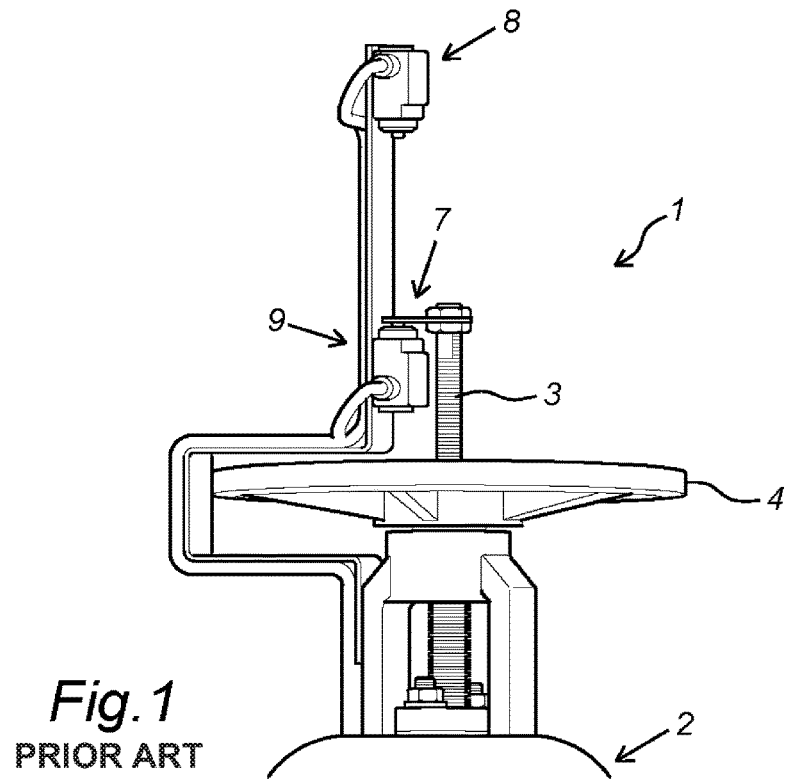
FIG. 1 shows a valve position indicator according to the state of the art.

So as to obtain one or more of the above aims, the invention provides a valve position indicator comprising the features according to claim 1. The valve position indicator according to the invention is characterized in that it further comprises two sets of mutually cooperating main rotation axle, main axle disc, gear wheel and indication means; a first set being embodied for indicating an open position of said valve, and a second set being embodied for indicating a closed position of said valve. This valve position indicator can be easily set so as to accurately indicate a position of a valve.

It has also shown that the valve position indicator according to the present invention can be easily adapted to different valve types and numbers of rotation that are required to fully open or close a valve. Such synergetic action is completely unexpected.

It has also shown that the valve position indicator according to the invention can be housed in a small housing providing advantage in complicated technical areas. The valve position indicator may be coupled to virtually every valve.

Due to the discrete displacement of the indication means when the valve has reached a predetermined position, the indication means may be housed in a housing comprising a window through which said indication means becomes visible after said valve has reached said position.

The invention furthermore provides the advantage that an easy setting of the indication of both a closed position and a fully opened position of the valve is obtained in a single valve position indicator, which is obtained due to the fact that said valve position indicator further comprises two sets of mutually cooperating main rotation axle, main axle disc, gear wheel and indication means; a first set being embodied for indicating an open position of said valve, and a second set being embodied for indicating a closed position of said valve.

Within the present invention, the indication means may be a mechanical part that acquires a predetermined position, but may also be a signaling means, for example a light emitting object like a light or a led, an electronic component providing an electric signal to a switchboard or control board in a control room, or the like. An indication means on the valve position indicator itself provides the advantage that an operator in the field may directly read the valve's position. On the other hand, an electronic signal that is sent to a control room provides a direct indication to a central operator who then is capable of controlling a series of valves simultaneously. As a matter of fact, both kinds of indication means may be provided.

According to the present description and claims, the term "indication means" relates to both mechanical means that may or may not be visible through a window, and relates to light emitting means like a led or a light. Such light emitting means may or may not be provided through a window. For example, a light emitting means may be provided directly on the housing of the valve indicator.

It is preferred for the valve position indicator that said main rotation axle, said main axle disc and said gear wheel are housed in a common housing. For then, connecting said main axle to a valve stem or spindle or any other actuating means for changing a valve's position provides an indication of a position of said valve. Also, a housing may be made liquid and gastight, such that the device fulfils safety regulations as desired or required by national or other law.

It is furthermore preferred for said indication means being housed in said housing as well, said housing comprising a window for providing visibility to said indication mean. Such provides an even further enhanced safety. Especially, a window provides a direct and immediate visual identification as to the valve's position to an operator in the field.

When a circumferential edge of said main axle disc is positioned within a space defined by two consecutive teeth of said gear wheel for hindering a rotational movement of said gear wheel, it provides both a free movement of the main axle disc along the gear wheel and also prevents the gear wheel to be rotated since it is hindered by the toothless portion of said main axle disc. Hence, especially when a large number of rotations of said valve stem or spindle are required for changing its position from a closed to a fully opened state, or vice versa, the number of rotations of said gear wheel remains relatively limited. Preferably, the number of rotations of said gear wheel is limited to less than one complete rotation, for then the indication means is visible only once when changing said valve position. More in particular, the indication means is visible only when the valve is in its closed or fully opened position.

A further advantage of the valve position indicator according to the present invention, since a fully closed and a fully opened state are accurately indicated, is that the position in between is accurately indicated as well, since in that case no signal is obtained. Due to the abrupt change from "no signal" to "signal" vice versa, a position in between said fully opened and fully closed states is accurately indicated by the valve position indicator according to the present invention.

According to the present invention the term "fully opened" relates to a maximum opening of a valve in a required application. An operator may want to indicate a valve is "fully opened" if it is opened maximally, i.e., when no further turning of the valve stem or spindle is possible. However, in some embodiments, an operator may want to indicate an opening of for example 60% as a "fully opened" state.

Similarly, the term "fully closed" relates to a maximum closing of a valve in a required application. In a similar fashion, an operator may want to indicate a valve is "fully closed" if it is closed maximally, i.e. when no further turning of the valve stem or spindle is possible. However, in some embodiments, an operator may want to indicate a closing of for example 80% as a "fully closed" state, even though the valve is still opened for 20%. The terms "closed" and "opened" therefore do not strictly mean that a further closing or opening, respectively, would be impossible.

According to a further preferred embodiment, said main axle and said main axle disc are positionable in a mutually connected position and a mutually disconnected position, such that in said mutually disconnected position a rotation of said main axle yields no rotation of said main axle disc. This provides the possibility of easily setting the indication means at a fully opened or closed position of said valve. This will be further elucidated hereafter.

According to a further aspect, the invention also relates to a method for using a valve position indicator according to the present invention as mentioned above, said method comprising the step of coupling said main axle with a valve actuating mechanism, preferably with a rotating stem or spindle of a valve actuating means, and actuating said valve stem or spindle so as to induce a rotational movement of said main axle, wherein said indication means is rotated so as to provide an indication of a position of said valve. This method provides the advantages as indicated above.

It is especially preferred that in the method according to the invention, said valve position indicator is comprised in a housing, for example with a window for providing visibility to said indication means or with a light or a led, if said valve is in a predetermined position, preferably in a closed or an opened position. Such provides easy and accurate reading of the indication means.

It is especially preferred that said main axle disc is dis-connectable with respect to said main axle, such that in a connected state a rotation of said main axle induces a rotation of said main axle disc, vice versa, and in a disconnected state a rotation of said main axle induces no rotation of said main axle disc, vice versa. Such provides easy setting of the indication means at a fully opened or closed position of the valve.

For that reason, the method according to the invention may comprise a step of disconnecting said main axle disc from said main axle, a step of actuating said valve stem or spindle for bringing said valve into a closed position, a step of bringing said indication means into a position that resembles a closed position of said valve, and a step of connecting said main axle disc to said main axle.

Analogous to that, the method may comprise a step of disconnecting said main axle disc from said main axle, a step of actuating said valve stem or spindle for bringing said valve into a fully opened position, a step of bringing said indication means into a position that resembles a fully opened position of said valve, and a step of connecting said main axle disc to said main axle.

It is especially preferred for the method according to the invention to comprise a step as mentioned above for setting a first indication means to indicate a fully closed position of said valve and a further step as mentioned above for setting a second indication means to indicate a fully opened position of said valve. That provides for an easy indication of both the opened and the closed position of the valve.

Hereinafter, the invention will be further elucidated with reference to the drawings. In the figures the same parts are denoted by means of the same reference numerals. However, for ease of understanding the invention, not all parts that are required for a practical embodiment have been shown.

FIG. 1 shows a valve position indicator 1 according to the state of the art. The indicator 1 as shown in FIG. 1 is of the rising stem type. A valve (not shown), housed in a valve housing 2, is connected to a valve stem or spindle 3. Said valve stem or spindle 3 is at one position operatively connected with said valve and at another position connected with an operating wheel 4. Said operating wheel 4 as shown in FIG. 1 can be rotated manually so as to rotate valve stem or spindle 3 and thus for actuating said valve for opening or closing same. An indication means 7 is connected to the valve stem or spindle 3 and travels up and down, depending on the position of the valve. Sensors or switches 8, 9 are provided at an uppermost and a lowest position and determine said end positions of said indication means 7, hence indicating a fully closed or fully opened position of said valve. Due to the relatively large height of the rising stem, this valve position indicator must be tailor made which is a huge disadvantage since each specific situation requires its own spare part.

Figure 2:
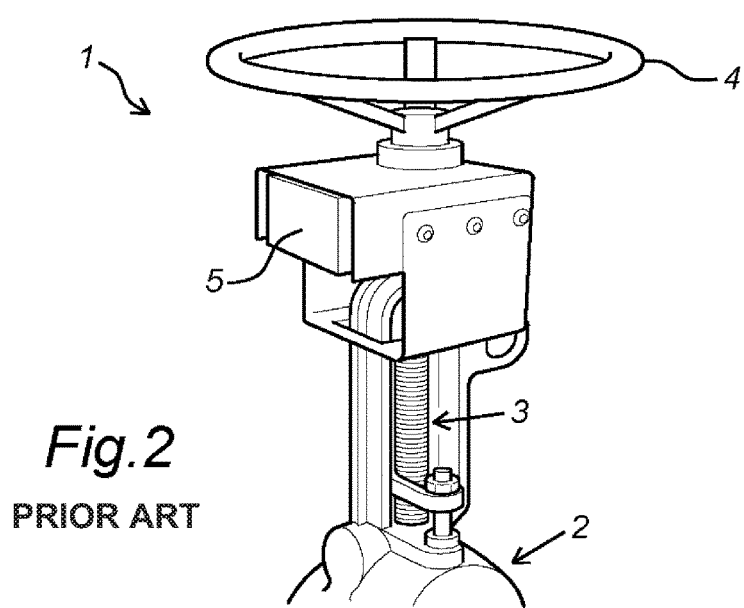
FIG. 2 shows another valve position indicator according to the state of the art.

FIG. 2 shows another embodiment of a valve position indicator 1 according to the state of the art. A valve (not shown), housed in a valve body 2, also indicated as valve housing 2, is connected to a valve stem or spindle 3. Said valve stem or spindle 3 is at one position operatively connected with said valve and at another position connected with an operating wheel 4. Said operating wheel 4 as shown in FIG. 1 can be rotated manually so as to rotate valve stem or spindle 3 and thus for actuating said valve for opening or closing same. For example, said wheel 4 has to be rotated forty turns for changing said valve from a fully opened state into a fully closed state. A gear system, forming part of said valve position indicator 1, is on the one hand operatively connected to said valve stem or spindle 3 and on the other hand connected to an indication means, and may comprise a plurality of gears for reducing the volume and size of said indication means with respect to said valve stem or spindle 3.

The valve position indicator 1 according to FIG. 2 needs to be manufactured as a tailor made solution, depending on the valve and of the sensor or switch type used as indication means.

Figure 3:
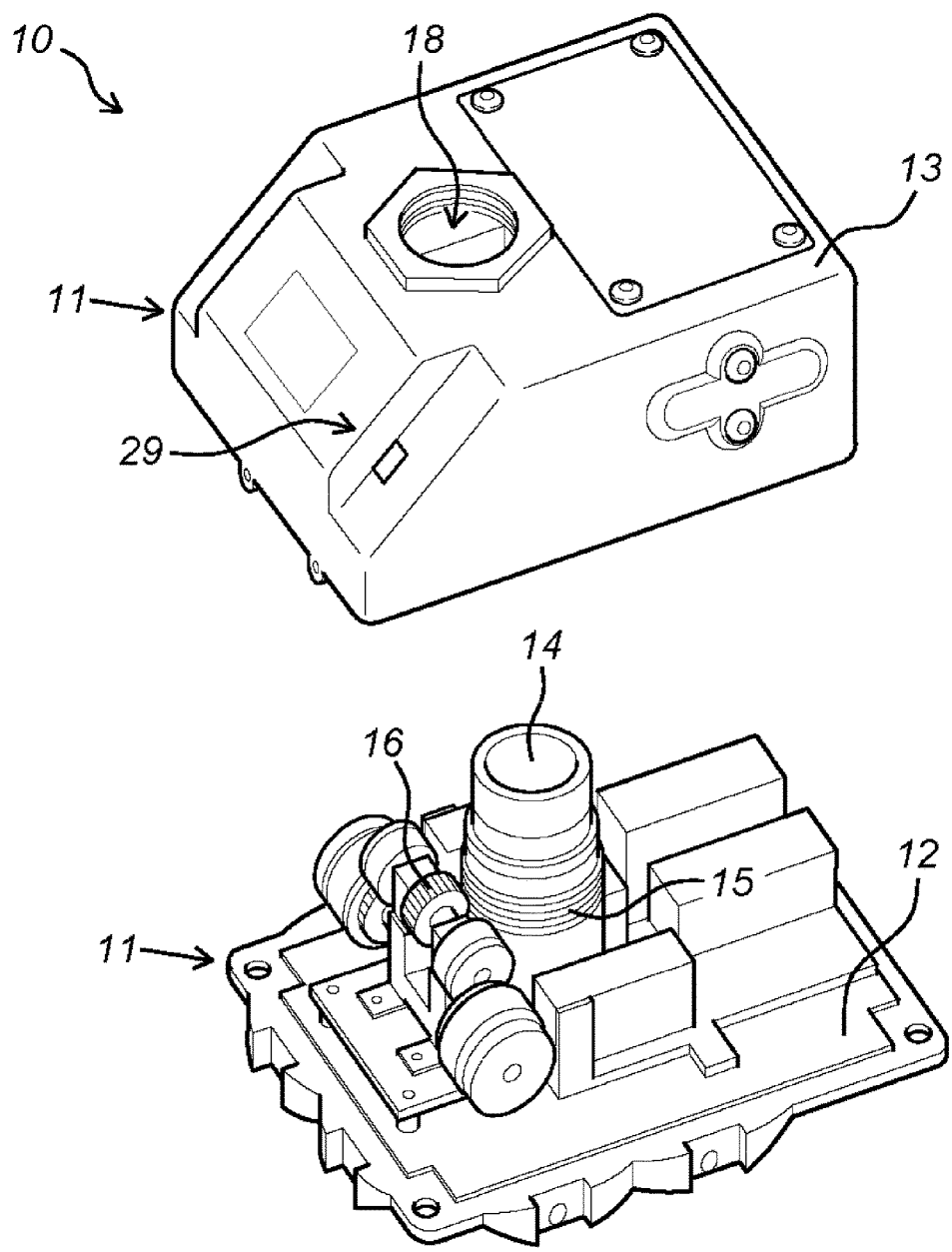
FIG. 3 shows an embodiment of a valve position indicator according to the present invention.

In FIG. 3 a valve position indicator 10 according to the present invention is shown. The valve position indicator 10 is comprised of a housing 11 that in its turn is comprised of a bottom part 12 and a cap 13 to be connected to said bottom part 12.

A series of mutually operably parts is connected to said bottom part 12. Firstly, a rotating tube 14 is provided, for connecting a valve stem or spindle 3 (not shown in FIG. 3). Said rotating tube 14 comprises thread 15 for cooperation with a worm gear 16 on a main axle 17 of valve position indicator 10. Upon rotation of said rotating tube 14, said main axle 17 is rotated as well.

Said rotating tube 14 is accessible through opening 18 in housing cap 13. As a consequence, an operating wheel or any other device for rotating said valve stem or spindle may be connected to said rotating tube 14 when said cap 13 is connected to said bottom part 12.

Figure 4:
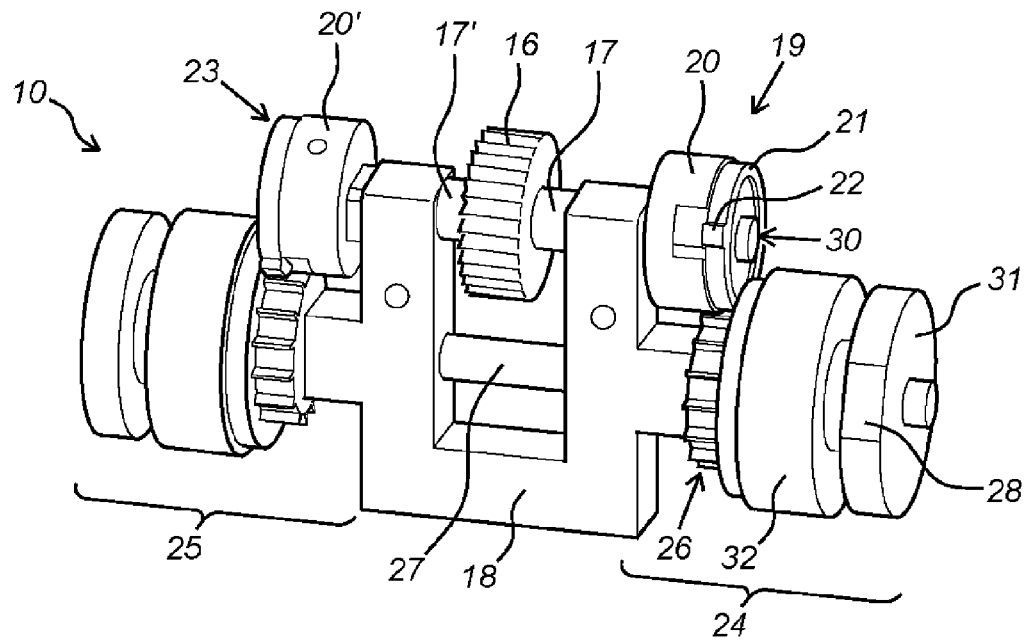
FIG. 4 is a schematic view of parts of a valve indicator according to the invention.

FIG. 4 shows a more accurate view of part of the valve posi-tion indicator 10 according to the present invention.

Figure 6:
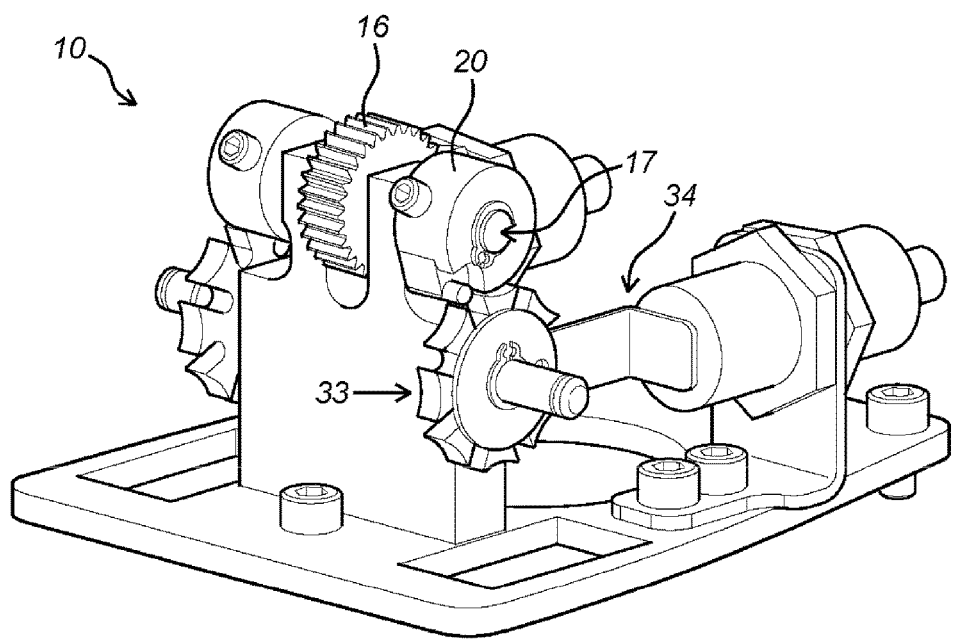
FIGS. 6 and 7 show alternative embodiments of the valve position indicator according to the present invention.

The valve position indicator 10 comprises a series of gears and axles that are cooperatively connected to a frame 18. Said worm gear 16 is connected on a main axle 17. Also, a main axle disc 19 is provided on said main axle 17. Said main axle disc 19 is comprised of a fixedly connected disc base 20 and a disc top 21. In the embodiment shown, said disc top 21 comprises a single tooth 22 on its outer circumference, i.e. on its circumferential edge 23 for driving a gear wheel 26. Instead of a tooth 22, as in a common gear, another cam like member may be provided for inter-action with said gear wheel 26. Preferably, a Geneva wheel construction 33 is applied, as shown in FIG. 6.

As a matter of fact, in the embodiment shown in FIG. 4, valve position indicator 10 is built symmetrically. A first indication part 24 is shown at the right side of the figure, whereas a second indication part 25 is shown at the left side of the figure. For example, right part 24 may be used for indicating a closed position of the valve whereas left part 25 may be used for indicating a fully opened position of the valve. Analogous or identical parts are distinguished by means of quotation stabbing (for example parts 17 and 17'). In this description, reference is mainly given to the right part 24 of the valve position indicator 10.

Tooth 22 of main axle disc 19 cooperates with gear wheel 26 so as to have gear wheel 26 rotate when said tooth 22 interacts with a tooth of said gear wheel 26. Since said disc top 21 comprises only a single tooth 22, gear wheel 26 will only be moved over the length of 1 tooth every turn of main axle disc 19. Gear wheel 26 is connected on a secondary axle 27.

As a matter of fact, said disc top 21 may comprise more than a single tooth 22, however, so as to obtain a maximum reduction in number of revolutions with respect to the valve stem or spindle, disc top 21 preferably comprises only a single tooth. In case two, three, four or even more teeth are applied on said disc top 21, these preferably are evenly distributed around its circumference.

As a matter of fact, in accordance with the present invention, providing a small main axle disc 19 (i.e. gear or disc top 21 completely covered with teeth as in a normal gear wheel, like gear wheel 26) and a relatively large gear wheel 26 (also completely covered with teeth, for example as shown in FIG. 6), thus providing a reduction in revolutions of gear wheel 26 with respect to main axle disc 19, does not provide the advantageous effect. For, then still a linear behavior of indication means 28 is obtained, since it moves in a constant travelling motion. Only a sufficiently large intermittent motion of gear wheel 26, and hence of indication means 28, provides the advantageous effect of the present invention. A linear transmission between main axle disc 19 and gear wheel 26 does not provide the advantageous effects of the present invention. Therefore, it is preferred that upon interaction of tooth 22 and gear wheel 26, gear wheel 26 travels over at least 10°, more preferably at least 15°, still more preferably at least 20°, and most preferably at least 24°, for example at least 36° or even 45°. Here, the term "degrees" or "°" refers to angular degrees. As a result, both a visual indication means and an electronic sensor/switch type indicator provide a direct and discrete signal indicating a fully opened or fully closed position of a valve.

In case a combination of a single main axle disc 19 and gear wheel 26 is not sufficient for providing a required reduction of movement, an additional reduction step may be provided. Such additional step may be comprised of an additional disc top 21-like disc comprising, for example, a single tooth that, for example, is connected onto the same axle 27 as gear wheel 26 and that actuates another gear wheel (not shown in the Figures) on another axle (not shown in the Figures) for actuating said indication means 28 or the like. Such provides the advantage that another reduction step is obtained. If a single reduction step yields a reduction of 100, the additional reduction step may yield a reduction of 1000, if the additional disc comprises a single tooth and said another gear wheel comprises 10 teeth.

An indication means 28 is connected to said secondary axle 27. Hence, when rotating gear wheel 26, said indication means 28 is rotated as well.

According to a preferred embodiment, and as shown in FIG. 3, said housing cap 13 comprises a window 29 through which indication means 28 may be spotted. When said indication means 28 is aligned with said window 29, this is indicative of a closed valve. As mentioned above, a lighting element, for example a led, may be provided instead of a window for showing the indication means.

As a matter of fact, an indication means is not limited to a visual indication means as generally shown in the Figures. It may be comprised of an inductive means as well, for providing an electronic signal, for example to send a signal to a control room or to flash a light. In the art, the term "inductive" is generally identified as "electronic". Within the meaning of the present invention, the term "electronic", like in "electronic switch" and "electronic sensor", relates to the term "inductive" in general as well. The term "electronic" therefore should not be construed narrowly but as broadly as possible, encompassing both electronic and magnetic sensors and switches. As known in the art, an inductive sensor/switch may be both an electronic sensor/switch and a magnetic sensor/switch.

Figure 5:
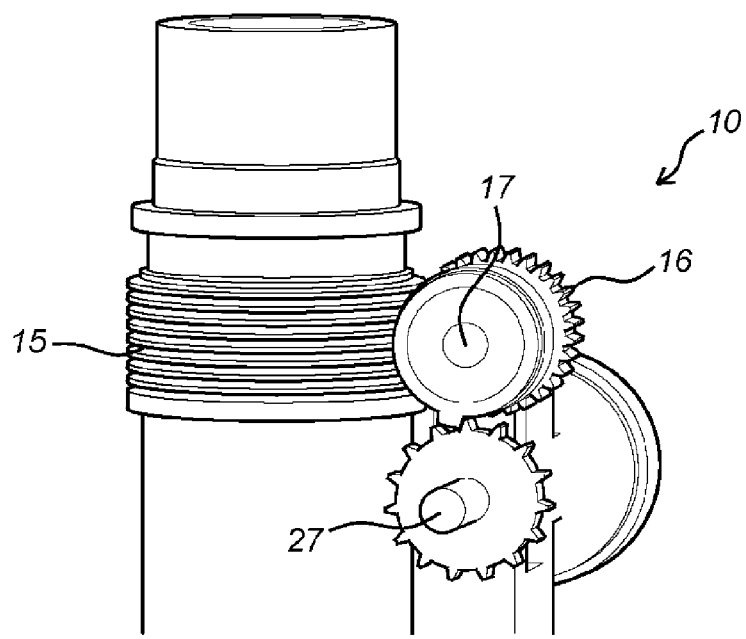
FIG. 5 is a schematic view of part of a valve indicator according to the invention.

FIG. 5 shows mutual cooperation of tooth 22 on disc top 21 with said gear wheel 26.

Setting the indication means 28 may be easily accomplished by disconnecting disc top 21 from main axle 17, for example, by loosening bolt 30. Also, indicator disc 31 with indication means 28 may be disconnected from manipulator disc 32. Then, rotation of main axle 17 will not induce rotation of said disc top 21 and indication means 28. After positioning said valve to a closed position, by rotating valve stem or spindle 3 and worm gear 16, the indication means 28 may be aligned with window 29 and tooth 22 may be positioned exactly in between two teeth of gear wheel 26. Then, indicator disc may be connected to said manipulator disc 32 and disc top 21 may be connected to main axle 17. Indication means 28 is then set to indicate a closed position of said valve.

Also, a new valve position indicator 1 may be easily in-stalled and set up. In a ready to install new valve position indicator, the indication means is set in a position for indicating a fully opened or fully closed valve whereas indicator disc and manipulator disc are disconnected. After installing said valve position indicator 1 and connected same to the valve stem or spindle 3, the valve is placed in its fully opened or fully closed state, respectively. Probably, said valve is already in one of these states. Then, indicator disc is connected to said manipulator disc, thus providing a ready to use valve position indicator 1. A valve position indicator 1 comprising a double indicator for both a fully opened and a fully closed state of a valve, requires setting up both states.

Similarly, the indication means at the left part 25 of the valve position indicator 10 may be set to indicate a fully opened position.

Several parts as shown in the figures above and in the pre-sent invention may be interchanged with similar or analogous parts. For example, the manual operating wheel 4 may be replaced by an electric motor or a pneumatic or hydraulic actuation means.

As an alternative embodiment, FIG. 6 shows an electronic switch 34 for indicating a fully opened or fully closed state of the valve.

Figure 7:
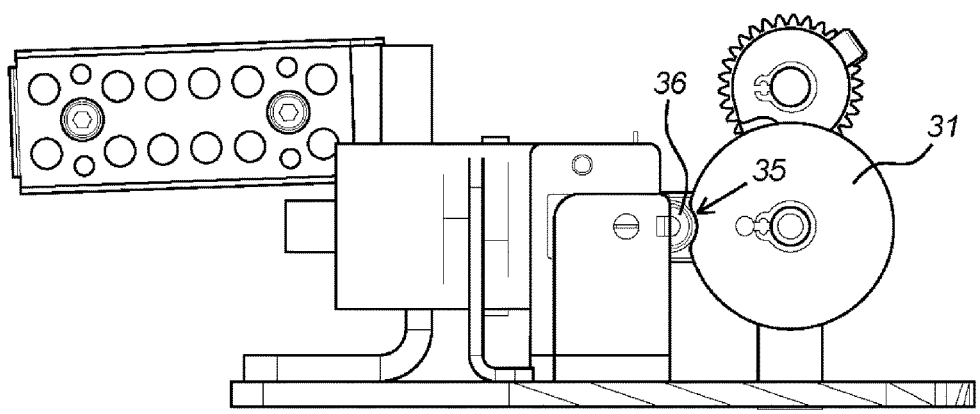

An alternative embodiment is shown in FIG. 7, wherein said an indicator disc 31 comprises an indentation 35 for activating a switch 36. Optionally, said indentation may be provided as a cam or ridge on said disc 31.

Also, the indication means 7 may be a visual indication means or an electronic indication means. A mechanical switch may for example be comprised of a mechanical limit switch (as manufactured by Bartec). Electronic indication means may for example be a EuroSwitch ferroswitch or GO switch (by Emerson Process/Topworx), a Pepperl&Fuchs proximity switch, for example of the NJ3 or SC type. A sensor or switch may advantageously be connected to the gear wheel 26, such that it intermittently moves when said gear wheel 26 is rotated and ultimately activated said switch. The switch then yields a signal for, for example, switching an indicator light or a LED on or off and that may be provided directly on the housing or on a control panel in a control room, or for giving any other signal indicating that the valve is in a fully opened or fully closed position.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A valve position indicator comprising a main rotation axle operably connected with said valve, wherein a repositioning of said valve provides a rotation of said main axle, said main axle being provided with a main axle disc comprising at least one tooth for cooperation with a gear wheel comprising a plurality of teeth evenly distributed along its circumference, said main axle disc further comprising along part of its circumference a toothless portion substantially not interfering with said gear wheel, such that said at least one tooth provides a rotation of said gear wheel and said toothless portion provides no rotation of said gear wheel upon rotation of said main axle disc; said gear wheel being provided on a secondary axle and wherein an indication means is operably connected with said second axle for providing an indication of a position of said valve, wherein said valve position indicator further comprises two sets of mutually cooperating main rotation axle, main axle disc, gear wheel and indication means; a first set being embodied for indicating an open position of said valve, and a second set being embodied for indicating a closed position of said valve.

2. A valve position indicator according to claim 1, wherein said main rotation axle, said main axle disc and said gear wheel are housed in a common housing.

3. A valve position indicator according to claim 2, said indication means being housed in said housing as well, said housing comprising a window for providing visibility to said indication means.

4. A valve position indicator according to claim 1, wherein a circumferential edge of said main axle disc is positioned within a space defined by two consecutive teeth of said gear wheel for hindering a rotational movement of said gear wheel.

5. A valve position indicator according to claim 4, wherein said main axle and said main axle disc are positionable in a mutually connected position and a mutually disconnected position, such that in said mutually disconnected position a rotation of said main axle yields no rotation of said main axle disc and vice versa.

6. A valve position indicator according to claim 1, wherein said indication means is rotated over at least 10° when said tooth provided on said main axle disc is rotated and interacts with said gear wheel.

7. A valve position indicator according to claim 6, wherein said indication means is rotated over at least 15° when said tooth provided on said main axle disc is rotated and interacts with said gear wheel.

8. A valve position indicator according to claim 6, wherein said indication means is rotated over at least 20° when said tooth provided on said main axle disc is rotated and interacts with said gear wheel.

9. A valve position indicator according to claim 6, wherein said indication means is rotated over at least 24° when said tooth provided on said main axle disc is rotated and interacts with said gear wheel.

10. A valve position indicator according to claim 6, wherein said indication means is rotated over at least 36° when said tooth provided on said main axle disc is rotated and interacts with said gear wheel.

11. A valve position indicator according to claim 6, wherein said indication means is rotated over at least 45° when said tooth provided on said main axle disc is rotated and interacts with said gear wheel.

12. A valve position indicator according to claim 1, wherein said main axle disc comprising said tooth is embodied as a Geneva wheel.

13. A method for using a valve position indicator according to claim 1, said method comprising the steps of coupling said main axle with a valve actuating mechanism, and actuating said valve actuating mechanism so as to induce a rotational movement of said main axle, wherein said indication means is rotated so as to provide an indication of a position of said valve.

14. A method according to claim 13, wherein said valve position indicator is comprised in a housing with a window for providing visibility to said indication means if said valve is in a predetermined position.

15. A method according to claim 13, wherein said main axle disc is disconnectable with respect to said main axle, such that in a connected state a rotation of said main axle induces a rotation of said main axle disc and vice versa, and in a disconnected state a rotation of said main axle induces no rotation of said main axle disc and vice versa.

16. A method according to claim 15, further comprising a step of disconnecting said main axle disc from said main axle, a step of actuating said valve actuating mechanism for bringing said valve into a closed position, a step of bringing said indication means into a position that resembles a closed position of said valve, and a step of connecting said main axle disc to said main axle.

17. A method according to claim 15, further comprising the step of disconnecting said main axle disc from said main axle, a step of actuating said valve actuating mechanism for bringing said valve into a fully opened position, a step of bringing said indication means into a position that resembles a fully opened position of said valve, and a step of connecting said main axle disc to said main axle.

18. A method according to claim 17, further comprising a step for setting a first indication means to indicate a fully closed position of said valve and a further step for setting a second indication means to indicate a fully opened position of said valve.

* * * * *